United States Patent [19]

Hoffman et al.

[11] Patent Number: 5,414,858
[45] Date of Patent: May 9, 1995

[54] SYSTEM AND METHOD FOR DYNAMICALLY VARYING BETWEEN INTERRUPT AND POLLING TO SERVICE REQUESTS OF COMPUTER PERIPHERALS

[75] Inventors: Harrell Hoffman; Mark D. Sweet, both of Austin, Tex.

[73] Assignee: International Business Machines Corporation, Armonk, N.Y.

[21] Appl. No.: 989,254

[22] Filed: Dec. 11, 1992

[51] Int. Cl.6 ............................................ G06F 13/24
[52] U.S. Cl. .................... 395/725; 340/825.08; 364/241; 364/280.8; 364/241.2; 364/232.9; 364/240; 364/240.1; 364/DIG. 1
[58] Field of Search ............... 395/275, 725, 325, 775, 395/650; 340/825.08; 370/95.2, 85.8; 379/92

[56] References Cited

U.S. PATENT DOCUMENTS

| | | | |
|---|---|---|---|
| 4,038,641 | 7/1977 | Bouknecht et al. | 364/900 |
| 4,038,642 | 7/1977 | Bouknecht et al. | 364/900 |
| 4,177,512 | 12/1979 | Moggia | 364/200 |
| 4,547,845 | 10/1985 | Ross | 364/200 |
| 4,742,335 | 5/1988 | Vogt | 340/518 |
| 4,780,715 | 10/1988 | Kasugai | 340/825.08 |
| 4,799,148 | 1/1989 | Nishioka | 364/200 |
| 4,829,297 | 5/1989 | Ilg et al. | 340/825.08 |
| 4,924,461 | 5/1990 | Amemiya et al. | 370/95.2 |
| 5,038,275 | 8/1991 | Dujari | 364/200 |
| 5,081,577 | 1/1992 | Hatle | 364/200 |
| 5,101,199 | 3/1992 | Suzuki | 340/825.08 |
| 5,155,839 | 10/1992 | Weppler | 395/500 |
| 5,239,652 | 8/1993 | Seibert et al. | 395/750 |

FOREIGN PATENT DOCUMENTS

| | | | |
|---|---|---|---|
| 2294834 | 12/1990 | Japan | G06F 9/46 |

OTHER PUBLICATIONS

IBM Technical Disclosure Bulletin, vol. 35, No. 4A, Sep. 1992, pp. 256–261, "Auxiliary Processor for Personal Computer Systems".

*Primary Examiner*—Gopal C. Ray
*Attorney, Agent, or Firm*—Casimer K. Salys

[57] ABSTRACT

A system and method for managing service requests from peripherals connected to a personal computer or workstation by operating both in an interrupt mode and a polling mode, with selective transition therebetween. In one practice of the invention, peripheral device service requests are first managed on an interrupt basis, then transition to a polling mode when the interrupt rate exceeds a rate threshold, and subsequently revert back to the interrupt mode when the rate again decreases below a threshold. The transition is dynamic and situation adjustable by parameter selection both as to the number of service requests and as to the time interval used to initiate transition between the interrupt and polling modes.

15 Claims, 2 Drawing Sheets

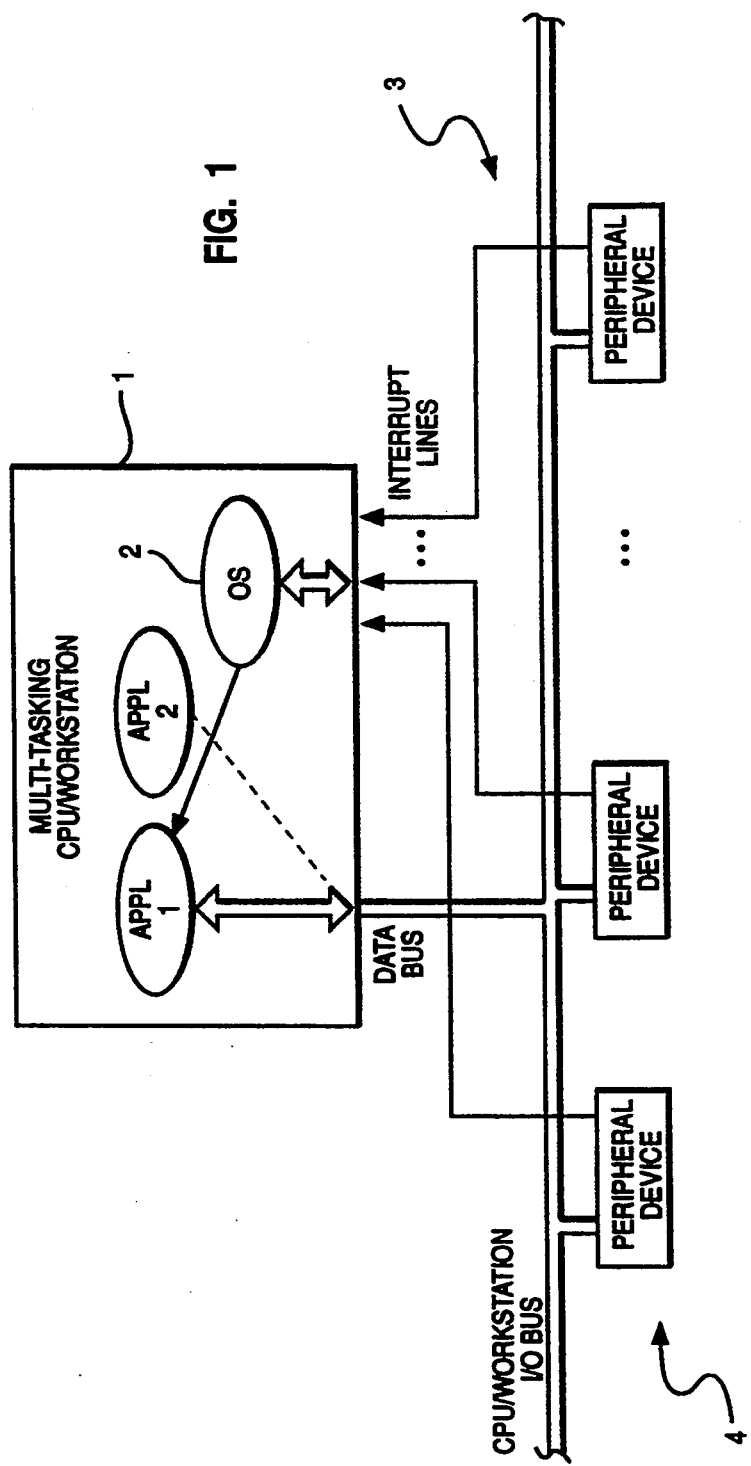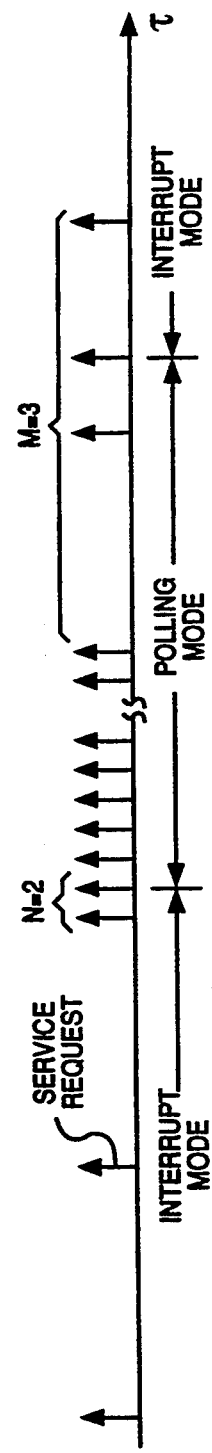

SYSTEM AND METHOD FOR DYNAMICALLY VARYING BETWEEN INTERRUPT AND POLLING TO SERVICE REQUESTS OF COMPUTER PERIPHERALS

BACKGROUND OF THE INVENTION

The present invention generally relates to servicing of requests from computer peripherals. More particularly, the invention is directed to systems, methods and programs for managing the mode of operation used to service the requests of peripherals connected to a workstation processor.

Contemporary personal computers and workstations have processor and operating system resources to multitask, have tremendous computational capability, and have input/output (I/O) resources to interface a diverse range of peripheral devices. For example, it is common to have a workstation I/O bus servicing a network communication adapter card, a printer interface, a keyboard interface, a mouse interface, and multiple non-volatile disk and tape media devices. The servicing of the devices by the workstation, whether it be by the central processor or an I/O processor, is conventionally initiated in one of two manners. The first practice involves the use of polling, whereby the processor successively queries the peripheral devices regarding their needs for servicing. The other approach involves the use of interrupts, where the peripheral devices signal the processor of a need for service. Each technique has its benefits and deficiencies.

In general, polling is considered to have a lower latency, in that the frequency of the queries to the peripheral devices can be made relatively fast. However, if the service needs of the peripheral devices are relatively low in occurrence, and the polling rate is fast to minimize latency, the processor performing the polling expends a disproportionately large amount of time polling in relation to other functions that the processor accomplishes.

An interrupt mode of operation, on the other hand, commonly exhibits a greater latency. This is attributable to the fact that the interrupt signal initiates an operating system routine, which software routine must first determine the origin of the interrupt and then evaluate the priority in relation to concurrent interrupt requests or an ongoing servicing. The disablement of an ongoing peripheral service as a consequence of a higher priority interrupt, and inherent delays associated with the determination of a priority for each interrupt, result in an average high latency for a high service rate interrupt mode I/O system. On the other hand, when the service demanded by the peripherals is relatively infrequent, the interrupt mode is on an average more processor efficient than the practice of polling.

The selection between a polling mode and an interrupt mode of servicing peripheral devices is integrated into the design of the I/O systems on the basis of anticipated usage. Unfortunately, the selection, irrespective of which mode is chosen, becomes unsuitable when the I/O system needs exhibit a mix of service request characteristics. For example, when the peripheral device service requests exhibit bursts of activity followed by extended periods of little or no activity, neither mode is particularly efficient.

SUMMARY OF THE INVENTION

The present invention provides an efficient system for managing service requests from multiple peripheral devices connected to a computer through the use of a means for operating the system in a first mode responsive to interrupt type service requests generated by one or more peripherals, a means for operating the system in a second mode involving a polling of one or more peripherals for service requests, and system means for transitioning between the first mode and the second mode responsive to the rate of the service requests. In another form, the invention relates to the methods practiced by the system so defined.

Preferred implementations of the present invention involve systems, methods and programs for selectively switching between an interrupt mode and a polling mode of servicing a multiplicity of peripheral devices connected to an I/O bus of a personal computer or workstation. Operation commences in the interrupt mode, whereby service request signals generated by the peripheral devices are resolved and managed upon receipt. The rates of the service requests are tracked through comparisons which relate the number of interrupts to units of time. If the rate exceeds a threshold or limit adjustable by a user application program, the mode transitions from interrupt responsive to a polling of the peripheral devices for service needs. The polling mode continues until such time that the rate decreases below the threshold, reverting the system to the initial interrupt mode of operation. In this way, the management of peripheral device servicing is dynamically optimized to the needs of the application program and peripheral devices.

These and other features of the invention will be more clearly understood and appreciated upon considering the detailed description Which follows hereinafter.

BRIEF DESCRIPTION OF THE DRAWINGS

FIG. 1 is a schematic block diagram of a processor system with I/O peripherals.

FIG. 2 is a schematic illustrating the effects of service requests along a time line.

DESCRIPTION OF THE PREFERRED EMBODIMENT

Figure 3:
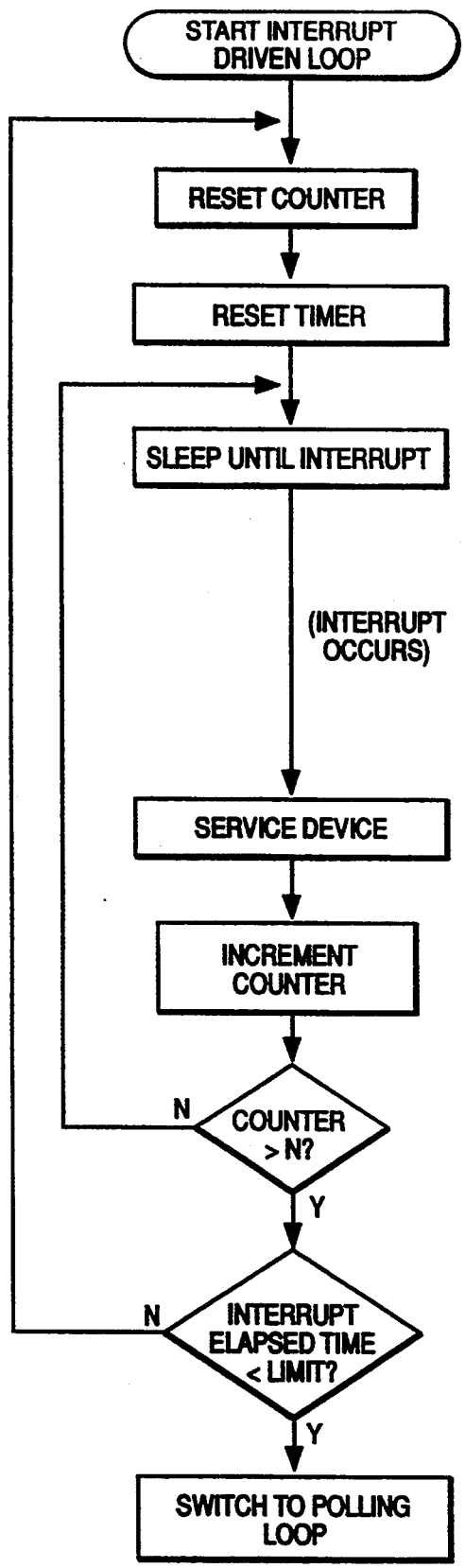
FIG. 3 is a flow diagram for the interrupt mode.

FIG. 1 illustrates an embodiment for practicing the present invention. As preferably implemented, the system uses a RISC System/6000 workstation 1 and related AIX Operating System 2, both products being commercially available from IBM Corporation. The workstation and operating system provide the user with multitasking capability in a manner commonly known by those using workstation technologies. The workstation includes an I/O bus, generally at 3, preferably conforming to the Microchannel (TM) architecture. FIG. 1 also shows multiple peripheral devices 4 connected to bus 3. Such devices include, but are not limited to, network communication cards, printers, modems, non-volatile disk or tape storage media and multimedia cards. In this architecture, the peripheral devices communicate service requests through interrupt lines, which service requests are managed by operating-system 2. For example, the receipt of an interrupt signal initiates, through operating system code, workstation processor actions to determine the origin of the interrupt, to resolve interrupt concurrency conflicts, and to compare interrupt priorities either among concurrent interrupts or with reference to the application program, such as application program 1 executing on the workstation at the time of the interrupt. In most situations, the processor temporarily ceases executing the application code to process the interrupt code. Interference with ongoing applications is particularly detrimental when the interrupt priority is such that the operating system must invoke a second application, such as application 2 in workstation 1, to service a high priority peripheral device. Disruptions initiated by interrupt mode operation materially decreases both the average processing rate and service request response times of the workstation as the frequency of the service requests increases. With the advent of more peripheral devices, especially those operating at higher data rates, as is common for graphics animation or video information processing, an interrupt mode of operation has proven to be very inefficient.

The alterative convention, namely that of polling peripheral devices for service requests, improves the average response time in high service requests rate environments but consumes a disproportionately large amount of processor resources when the peripheral device service request rate is low. In low demand situations, a disproportionate amount of processor time is expended polling as opposed to processing applications or servicing peripheral devices.

The present invention defines a system and method for transitioning or switching between an interrupt mode and a polling mode for the servicing peripheral devices. In a preferred implementation, the system begins operation in the interrupt mode. A workstation timer is related to an interrupt counter to determine interrupt rates. When the rate during a selected interval of time increases above a set threshold or limit, the system transitions to a polling mode.

In the context of the system of FIG. 1, the polling mode code is incorporated in application program 1. The selection of the peripheral device to be serviced is based upon an application program controlled polling of the interrupt lines. While in the polling mode, a similar timing and counting practice provides rate information suitable to determine when the service request rate decreases below the specified threshold. Thereupon, the system and method revert to the interrupt mode of operation. In this way, peripheral device servicing is dynamically switched between an interrupt mode and a polling mode depending on the rates of the service requests generated by the peripheral devices.

FIG. 2 depicts along a time line an example of multiple service requests, designated by arrows, and the effects upon the modes defined by the present system and method. Operation begins in the interrupt mode and continues in that mode until such time that the rate of the service requests exceeds a threshold value. Thereupon, the polling mode is invoked and continues likewise until the rate drops below the defined threshold value. At that point, the interrupt mode is again initiated.

Figure 4:
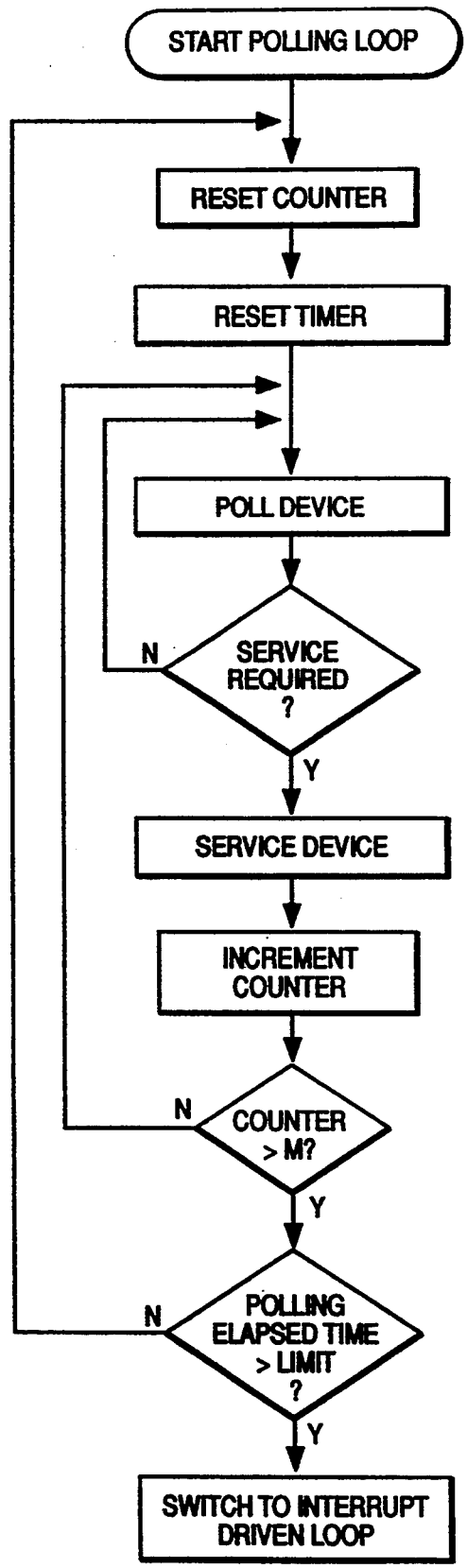
FIG. 4 is a flow diagram for the polling mode.

FIG. 3 depicts by flow diagram the methods implemented in the system of FIG. 1 to initiate the interrupt mode and determine the need for transition to the polling mode, as defined by a combination of an interrupt count and elapsed time. FIG. 4 depicts a corresponding flow diagram for the polling mode, including the rate defined transition back to the interrupt mode of operation. The polling mode also utilizes the combination of service requests count and elapsed time to determine rate. Note that the transitions between modes as depicted with reference to the time line plot in FIG. 2 correspond to counter values of $N=2$ and $M=3$ as defined in the respective interrupt and polling mode flow diagrams of FIGS. 3 and 4.

The selection of the values for N, M and the time interval is situation dependent. In this regard, the values are determined by the characteristics of the system as a whole including the workstation processor, the operating system, the number and types of peripherals, and the application programs executing and interfacing to the peripherals. A system using the combination of both service request counters and elapsed time measures for mode determination provides the designer with broad flexibility. For example, the parameters can be specified by focusing on the number of service requests received before a transition is initiated, or on the interrupt latency. Interrupt latency is the delay from the time that an interrupt mode signal is received on an interrupt line to the time that the application program provides the requested service. Again, this depends not only on the operating system activities of determining the origin and priority of the interrupt, but also on the need for switching application programs to service the peripheral device. Similarly, the count and time parameters are independently adjustable for polling latency as may vary with polling frequency. With the interrupt mode count N, the interrupt elapsed time, the polling mode count M and the polling mode elapsed time being independently selectable parameters, the embodiment provides significant flexibility in defining the transitions between the modes of operation.

The preferred embodiment of the invention has been described with reference to the I/O system in the noted RISC System/6000 workstation. It should, however, be understood that the invention is not limited to a classical I/O bus, but can with equal relevance apply to a system or processor bus which has devices peripheral to the processor competing for processor servicing resources. For example, new fiber channel communication devices and video processing cards which have data processing rates greater than the capabilities of conventional I/O buses are being connected directly into the processor or system bus. Such peripherals to the processor operate analogously, in that they request servicing by the processor, but merely do so at a bus level more intimate than the I/O bus. In such contexts, an I/O interface processor may be itself competing with the earlier noted fiber channel input and video card input as a peripheral to the central processor. The present invention applies with equal import in such situations.

Though the invention has been described and illustrated by way of specific embodiments, the systems and methods encompassed by the invention should be interpreted consistent with the breadth of the claims set forth hereinafter.

We claim:

1. A system for managing service requests from a group of peripherals connected to a data processor, comprising:

means for operating the system in a first mode of servicing the group of peripherals responsive to interrupt type service requests generated by one or more peripherals of the group;

means for operating the system in a second mode of servicing the group of peripherals involving a polling of one or more peripherals of the group for service requests; and system means, coupled to the means for operating the system in first and second modes for transitioning between the first mode of servicing the group of peripherals and the second mode of servicing the group of peripherals responsive to changes in the time related rate at which service requests are generated by the group of peripherals.

2. The system recited in claim 1, wherein the system means transitions from the first mode to the second mode upon an increase in the rate of service requests.

3. The system recited in claim 2, wherein the system means operates in the first mode during low rates of service requests.

4. The system recited in claim 3, wherein the system means transitions from the second mode to the first mode upon a decrease in the rate of service requests.

5. The system recited in claim 4, wherein the rate of service requests is determined by relating a count of the service requests accumulated to an interval of time.

6. The system recited in claim 5, further comprising:
an I/O bus of the data processor commonly shared by the multiple peripheral devices.

7. A method for managing service requests from a group of peripherals connected to a data processor, comprising the steps of:
operating the system in a first mode of servicing the group of peripherals responsive to interrupt type service requests generated by one or more peripherals of the group;
operating the system in a second mode of servicing the group of peripherals involving a polling of one or more peripherals of the group for service requests; and
transitioning between the first mode of servicing the group of peripherals and the second mode of servicing the group of peripherals responsive to changes in the time related rate at which service requests are generated by the group of peripherals.

8. The method recited in claim 7, wherein transitioning is from the first mode to the second mode upon an increase in the rate of service requests.

9. The method recited in claim 8, wherein operation is in the first mode during low rates of service requests.

10. The method recited in claim 9, wherein transitioning is from the second mode to the first mode upon a decrease in the rate of service requests.

11. The method recited in claim 10, wherein the rate of service requests is determined by relating a count of the service requests accumulated over a specified interval of time common to both first and second modes.

12. A program product operable on a workstation to manage service requests from a group of peripherals connected to the workstation, comprising:
means for operating the workstation in a first mode of servicing the group of peripherals responsive to interrupt type service requests generated by one or more peripherals of the group;
means for operating the workstation in a second mode of servicing the group of peripherals involving a polling of one or more peripherals of the group for service requests; and
workstation means, coupled to the means for operating the workstation in first and second modes, for transitioning between the first mode of servicing the group of peripherals and the second mode of servicing the group of peripherals responsive to changes in the time related rate at which service requests are generated by the group of peripherals.

13. The apparatus recited in claim 12, wherein the workstation means transitions from the first mode to the second mode upon an increase in the rate of service requests.

14. The apparatus recited in claim 13, wherein the workstation means operates in the first mode during low rates of service requests.

15. The apparatus recited in claim 14, wherein the workstation means transitions from the second mode to the first mode upon-a decrease in the rate of service requests.

* * * * *